April 29, 1958 W. A. CYPHERS 2,832,314
MULTIPLE PULSATING ASSEMBLY
Filed Dec. 13, 1954 2 Sheets-Sheet 1
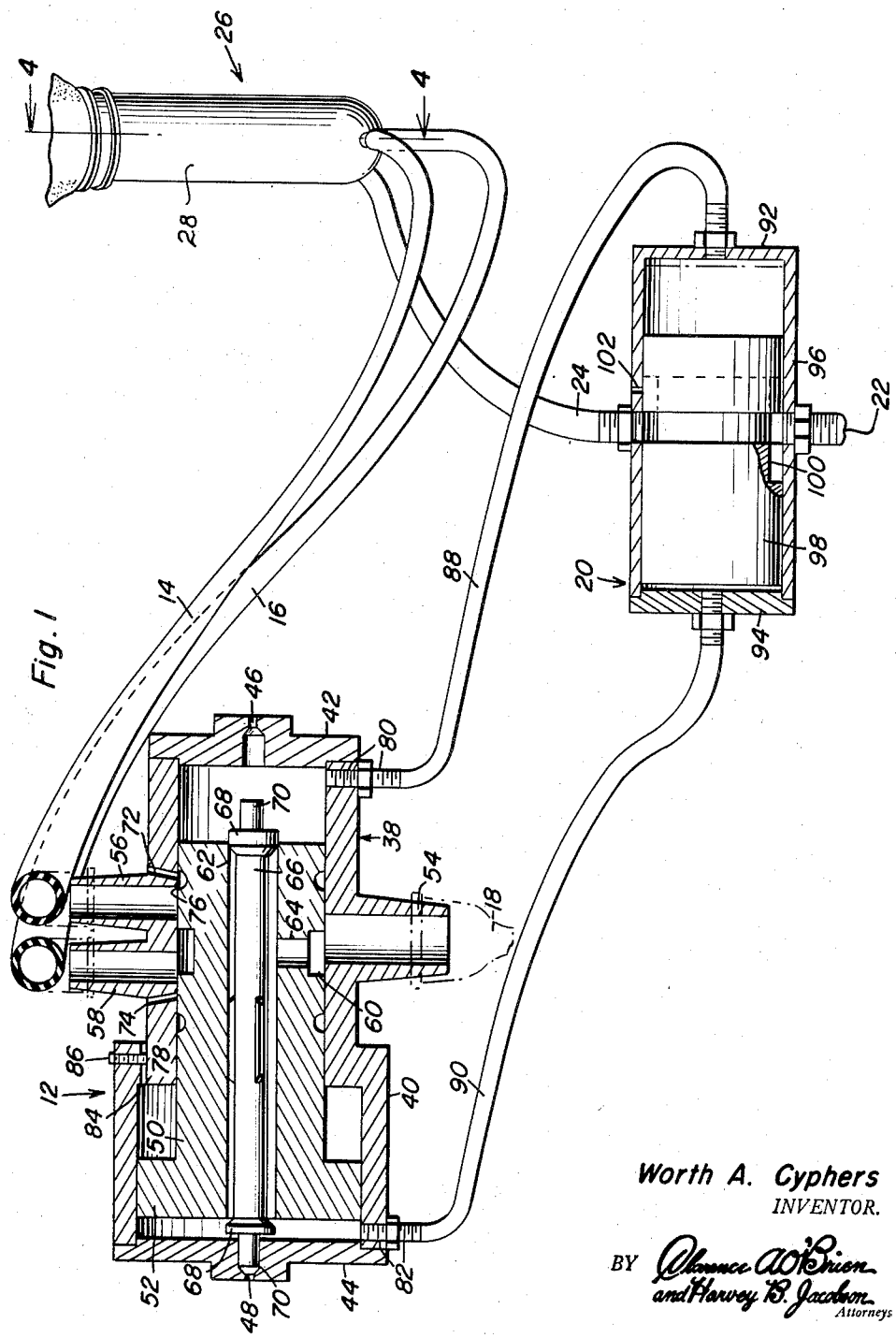
Worth A. Cyphers
INVENTOR.

April 29, 1958 W. A. CYPHERS 2,832,314
MULTIPLE PULSATING ASSEMBLY
Filed Dec. 13, 1954 2 Sheets-Sheet 2
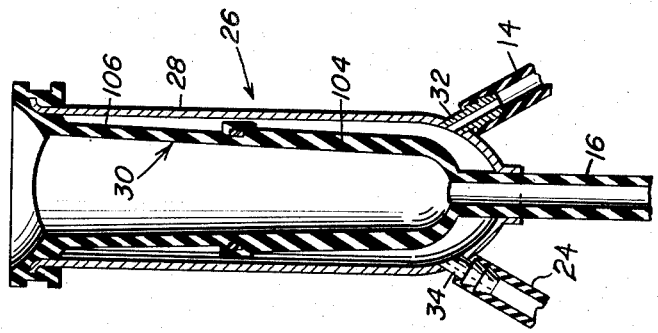
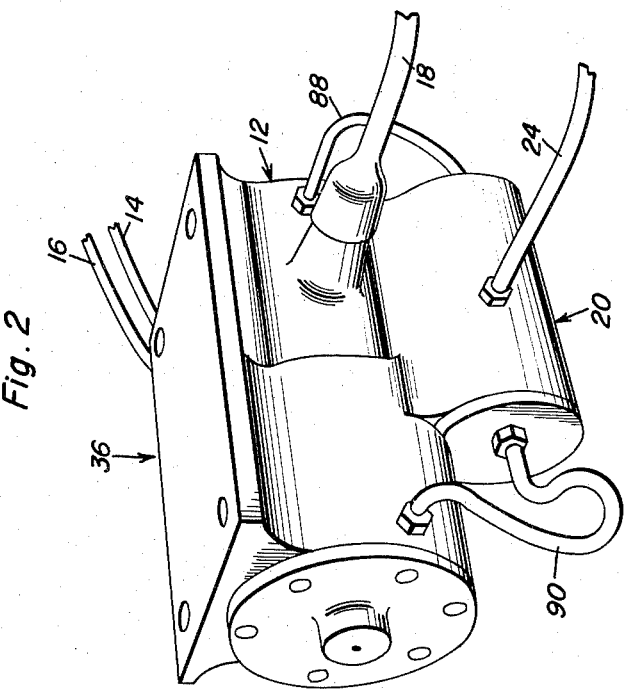
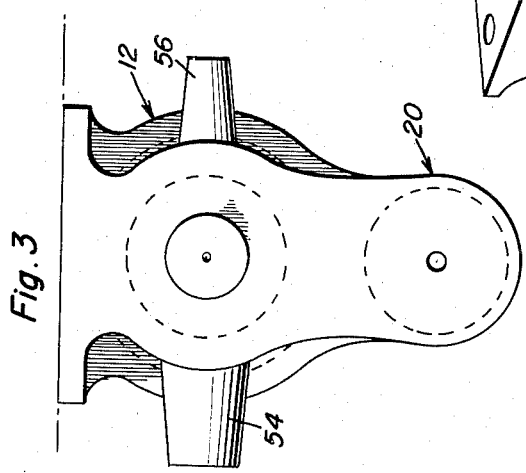
Worth A. Cyphers
INVENTOR.

United States Patent Office 2,832,314
Patented Apr. 29, 1958

2,832,314

MULTIPLE PULSATING ASSEMBLY

Worth A. Cyphers, Mount Gilead, Ohio

Application December 13, 1954, Serial No. 474,673

2 Claims. (Cl. 119—14.38)

The present invention relates to automatic milking machinery, and more particularly relates to a pulsating system for reducing the vacuum necessary in the withdrawal of milk from the teats of the animals being milked.

In conventional vacuum pulsator systems, the teat cup and its inflator are respectively connected to a pair of vacuum lines which open into a pulsating valve housing whereby a vacuum is alternately created and released in the inflator and the teat cup shell surrounding the inflator, the vacuum in the inflator being created upon release of the vacuum in the teat cup shell.

In such systems, the vacuum in the inflator necessary to keep milk flowing from the teat is from 15–20 lbs. per sq. in. (gauge) which causes inflammation of the teat through a combination of the unnatural inflation of the teat and the constriction of the mouth of the milk channel in the teat. Continued use of this system causes the teats to become sore and continuously inflamed until they eventually become insensitive and lacking in response to milking stimulus, causing the udder to retain a portion of its milk.

Accordingly, the primary object of the present invention is in the construction of a pulsator and teat cup assembly that provides a positive squeezing pressure on the wall of the teat enabling a substantial reduction in the vacuum necessary within the teat cup inflator to withdraw the milk from the teat.

A highly important object of the invention, ancillary to the primary object, is in the provision of a novel pulsating mechanism which will alternately in timed relation release and create a partial vacuum in the milk line while raising the pressure in the space between the teat cup shell and the inflator from normal atmospheric pressure to a higher compressing pressure and then releasing such higher pressure.

In accordance with the last mentioned object, it is a further object of the invention to provide such a pulsating assembly which can utilize with minor modification conventional pulsators already in existence by the addition of a second pulsator assembly operating in response to the conventional pulsating mechanism.

Another very important object of the invention is in the provision of a novel teat cup for use with the pulsating mechanism, which teat cup constitutes a modification of my teat cup set forth in Patent No. 2,541,988 issued to me on February 20, 1951.

A final object of the invention to be mentioned specifically is in the manufacture of a pulsating assembly for milking machines whereby the necessary vacuum to extract milk from the teats need not exceed 8 lbs. per sq. in. (gauge).

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is in the form of a flow diagram disclosing the cooperation of the parts forming the assembly, with the components of the pulsating mechanism being shown in enlarged, cross-sectional detail;

Figure 2 is a perspective view of the pulsator when utilized in its intended manner as a unitary assembly;

Figure 3 is an end view of the pulsator; and

Figure 4 is an enlarged cross-sectional view of the teat cup for use with the pulsating assembly taken substantially along the plane of section line 4—4 of Figure 1.

Referring to the drawings in detail, attention is first directed to Figure 1 wherein the combination pulsator and teat cup assembly is illustrated in the form of a flow diagram to facilitate a clear understanding of the operation thereof.

Essentially, the pulsating system of the present invention comprises a first vacuum responsive pulsating unit 12 having a pair of vacuum lines 14 and 16 leading therefrom, and a vacuum line 18 connected to a vacuum source opening thereinto. This pulsating unit 12 is conventional in construction, a slide valve mechanism being shown for purposes of illustration. It is to be understood that poppet valve systems as well as magnet systems now in conventional use could as easily have been utilized to disclose an operative structure, the sliding valve mechanism being shown primarily because of its simplicity of operation. The particular slide valve construction set forth may be found in Patent No. 1,182,215, issued May 9, 1916.

To this vacuum responsive pulsating unit, there is operatively connected a second pulsating unit 20 which is responsive to the actuation of the first unit for its pulsating movement.

A pressure line 22 leads from an air compressor or other suitable source of pressurized fluid to the pulsating unit 20, and a positive pressure line 24 leads from the pulsating unit 20 to the teat cup 26.

Noting for the moment Figure 4, the teat cup 26 is seen to comprise an outer shell 28 and an inner liner in the form of an inflator 30. The shell 28 is provided with a pair of nipples 32 and 34 opening thereinto while the inflator 30 opens at its lower end in the vacuum line 16. Although the line 16 is shown integral with the inflator it may be made separate without detracting in any manner from the operation of the system.

The free end of the positive pressure line 24 is attached to the nipple 34 to open into the space between inflator 30 and the shell 28 of the cup 26 while the second vacuum line 14 has its free end attached to the nipple 32.

Although the pulsator itself consisting of the units 12 and 20 is preferably constructed as a unitary assembly 36, as shown in Figure 2, the construction and operation of the units may be more clearly discerned in the flow diagram of Figure 1 and will be explained with relation to this figure.

The vacuum pulsator 12 comprises an elongated tubular cylinder 38 having an enlarged end portion 40, and end walls 42 and 44 closing the ends of the cylinder, the end walls themselves being provided with central valve ports 46 and 48, respectively, opening into the atmosphere. Slidably disposed within the cylinder 38 is a sliding valve 50 having an enlarged end 52 slidable within the enlarged end portion of the cylinder 38. The vacuum inlet 54 opens into the smaller portion of the cylinder 38 and diametrically opposite thereto are a pair of longitudinally spaced vacuum outlet nipples 56 and 58.

The smaller end portion of the sliding valve 50 is provided with an annular grooved channel 60 therearound which is at all times in communication with the vacuum inlet nipple 54 and alternately in communication with the vacuum outlet nipples 56 and 58. The sliding valve 50 is also provided with a longitudinal bore 62 therethrough, transverse bore 64 communicating the channel 60 with the longitudinal bore 62. An elongated plunger 66 is slidably disposed in the longitudinal bore 62 of the sliding valve 50 and is provided adjacent each end thereof with an enlargement 68 adapted to alternately close each end of the bore 62. The extremities of the plunger 66 are in the form of reduced rods 70 which serve as valves to alternately close off the valve ports 46 and 48 upon movement of the sliding valve within the cylinder 38.

The cylinder 38 is provided with transverse ports 72 and 74 therein adjacent the vacuum outlet nipples 56 and 58 which cooperate with annular grooves 76 and 78, respectively, to alternately expose the vacuum outlets nipples 56 and 58 to the atmosphere.

Also provided adjacent each end of the cylinder are nippled exhaust ports 80 and 82, respectively.

In the operation of the vacuum unit, as the vacuum is drawn through line 18 and nipple 54, in the position shown, a corresponding vacuum is drawn through the vacuum outlet nipple 58 while the outlet nipple 56 is exposed to the atmosphere to release the vacuum from the outlet nipple 56. At the same time, a vacuum is drawn through the longitudinal bore 62 within the slide valve 50 which withdraws air from the larger end of the cylinder and seats the valve 68 at the opposite end of the cylinder to draw the valve 50 toward the larger end 44 of the cylinder and seat the valve 70 in the port 48. Continued movement of the slide valve in this direction eventually closes communication between the large end 52 of the slide valve and the vacuum nipple 54 by closing the valve 68 at the larger end of the slide valve 52, causing the valve 68 at the opposite end thereof to open.

At this point, as will be readily apparent, the larger end of the slide valve 52 is adjacent the large end wall 44 of the cylinder so that a considerable space is provided between the shoulder joining the large end of the cylinder 38 to the smaller end thereof. At this shoulder, there is provided a port 84 which opens into the atmosphere, the opening of which is controlled by a suitable needle valve 86.

By virtue of the different surface areas exposed in the chamber formed between the larger end 52 of the sliding valve 50 and the shoulder of the cylinder and the smaller end of the sliding valve with the end wall 42 of the cylinder, in conjunction with the adjusted rate of air flow into and out of the port 84 by virtue of the needle valve 86, the rate of reciprocation of the sliding valve 50 may be controlled to alternately apply a vacuum to the vacuum outlets 56 and 58.

The ports 80 and 82 receive the nipples of lines 88 and 90, respectively, which lines open into the end walls 92 and 94, respectively, of a tubular cylinder 96 of the unit 20.

Within the cylinder 96 is a sliding valve 98 having an annular groove 100 therearound which is at all times in communication with the line 22 connected to the pressure source and opening into the cylinder 96.

The sliding movement of the valve 98 is, of course, controlled by the movement of the sliding valve 50 in the vacuum unit 12 by virtue of the connection of the lines 90 and 88 therewith. In other words, as shown in Figure 1, when a vacuum is being applied through the vacuum outlet nipple 58, the positive pressure line 24 leading from the cylinder 96 to the teat cup 26 is in registry with the groove 100 in the sliding valve 98 so that pressurized fluid flows through this line. When the cycle is reversed, the sliding valve 98 is moved to the right, as shown in Figure 1, and the pressure exhausts out the port 102 in the cylinder 96.

Turning now again to the teat cup 26 shown in detail in Figure 4, it will be noted that the inflator 30 is of generally rubber-like material with innate flexibility. The lower portion 104 of the inflator is relatively stiff as compared with the upper section 106 thereof.

In the operation of the pulsating apparatus, fluid, preferably air, under pressure enters the chamber within the test cup 26 between the shell 28 of the teat cup and the inflator 30 at a pressure of from 15–20 lbs. per sq. in. (gauge) while at the same time, a vacuum from 6–8 lbs. per sq. in. is drawn within the inflator 30.

The vacuum within the inflator 30 draws the teat into sealing relation with the inflator 30 toward the lower end of this inflator.

By virtue of the relative flexibility of the section 106 of the inflator with the section 104 thereof, the upper portion 106 of the inflator is greatly constricted by the incidence of the positive pressure within the space between the inflator and the outer shell of the teat cup in conjunction with the small vacuum being drawn within the inflator.

The stiffness of the lower section 104 of the inflator 30 protects the teat itself against undue constriction by the inflator 30 to aid the flow of milk during the constriction of the upper portion 106 thereof through the vacuum line 16 which constitutes the milk line.

Upon pulsating of the assembly and the drawing of the vacuum through nipple 56, the positive pressure within the teat cup is exhausted through the line 16 so that the space between the shell 28 and the inflator 30 again returns to atmosphere.

Thus, there is provided a pulsating system wherein the teat is constricted by the incidence of positive pressure necessitating subjecting the teat to only a very slight vacuum which will not damage the teat while by the particular teat cup provided constricting the teat in a normal milking operation.

From the foregoing, the construction and operation of the device will be readily understood and further explanation is believed to be unnecessary. Although vacuum is expressed herein in pounds per square inch (gauge), it is understood that vacuum could be expressed in any other conventional units such as inches of mercury or inches of water. Since numerous modifications and changes will readily occur to those skilled in the art, it is not desired to limit the invention to the exact construction shown and described, and accordingly, all suitable modifications and changes may be resorted to, falling within the scope of the appended claims.

What is claimed as new is as follows:

1. In a milking system which has a teat cup provided with a flexible inflator, a pulsator for a milking machine comprising a first vacuum responsive pulsating unit, a pair of vacuum lines extending therefrom, a second pulsating unit responsively associated with actuation to the actuation of said first unit, a pressure port in said second unit, a pressure line operatively connected to said port of second unit, said second unit including a housing, a slide valve in said housing and movable to positions by the first unit for opening and closing said pressure port, a sceond pressure port in said housing which is also controlled by said valve, said teat cup having an outer rigid shell which accommodates said flexible inflator, a pressure inlet line extending from said second port to said shell to apply periodic pressure pulses into the space between the inner surface of said shell and said inflator, said first unit having two outlets with lines connected therewith and arranged to function alternately as vacuum and exhaust means for the teat cup, and means connecting said lines respectively with said space between said shell and inflator and said inflator to apply suction to and exhaust the teat cup in coordination with the periodic application of pressure thereto from said second unit.

2. The milking system of Claim 1 wherein both of said units are structurally united and said means for attaching said lines to said teat cup comprise a nipple for each line.

References Cited in the file of this patent

UNITED STATES PATENTS

| | | |
|---|---|---|
| 1,043,013 | Hulbert | Oct. 29, 1912 |
| 1,089,839 | Hulbert | Mar. 10, 1914 |
| 1,478,802 | Stampen | Dec. 25, 1923 |
| 1,533,187 | Hapgood | Apr. 14, 1925 |
| 1,727,501 | Budach | Sept. 10 1929 |
| 1,945,386 | Stampen | Jan. 30. 1934 |
| 2,334,481 | Da Silveira | Nov. 16, 1943 |
| 2,541,988 | Cyphers | Feb. 20 1951 |
| 2,559,035 | Wall | July 3, 1951 |
| 2,570,749 | Barber | Oct. 9, 1951 |